US008862332B2

(12) United States Patent
Dolan et al.

(10) Patent No.: US 8,862,332 B2
(45) Date of Patent: Oct. 14, 2014

(54) METHOD OF OPTIMIZING THRESHOLD FOR AN AIRBAG SUPPRESSION SYSTEM IN A VEHICLE

(75) Inventors: John R. Dolan, Woodhaven, MI (US); Joseph P. Gleason, Royal Oak, MI (US); Steven G. Corrion, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 462 days.

(21) Appl. No.: 13/238,116

(22) Filed: Sep. 21, 2011

(65) Prior Publication Data

US 2013/0073148 A1 Mar. 21, 2013

(51) Int. Cl.
*B60R 21/00* (2006.01)
*B60R 22/415* (2006.01)
*B60R 22/10* (2006.01)
*B60R 21/013* (2006.01)
*B60R 22/36* (2006.01)

(52) U.S. Cl.
CPC ............. *B60R 22/415* (2013.01); *B60R 22/105* (2013.01); *B60R 21/013* (2013.01); *B60R 22/36* (2013.01)
USPC ........................... 701/45; 280/735; 280/801.1

(58) Field of Classification Search
CPC ...... B60R 21/00; B60R 21/01; B60R 21/015; B60R 21/017; B60R 21/023; B60R 21/205; B60R 21/2072; B60R 22/10; B60R 22/024; B60R 21/16; B60R 22/36; B60R 21/013; B60R 22/105; A01B 12/006
USPC .......... 701/45, 46, 36; 180/271, 273; 280/735, 280/801.1, 803
See application file for complete search history.

(56) References Cited

U.S. PATENT DOCUMENTS

| 4,518,132 | A | 5/1985 | Schmidt |
| 5,507,447 | A | 4/1996 | Corrion et al. |
| 2002/0027345 | A1* | 3/2002 | Aoki ............................. 280/735 |
| 2003/0074121 | A1* | 4/2003 | Sakai et al. .................... 701/45 |
| 2004/0178612 | A1* | 9/2004 | Tabe ............................. 280/735 |

* cited by examiner

*Primary Examiner* — Richard Camby
(74) *Attorney, Agent, or Firm* — Quinn Law Group, PLLC

(57) ABSTRACT

A method is presented of optimizing an airbag suppression threshold for an airbag suppression system in a vehicle. The method includes defining a first value as the airbag suppression threshold such that deployment of an airbag is suppressed above the first value. Next, one or more factors indicative of a presence of a child restraint seat in the vehicle seat are determined. The airbag suppression threshold is set to a predefined second value when each of the factors are met. The factors include determining whether a locking feature in a set belt webbing retractor is in a first state configured to prevent withdrawal of the seat belt webbing. Other factors may include determining whether a speed of the vehicle is within a predetermined speed range and whether a load applied to the vehicle seat is within a predetermined seatload range.

19 Claims, 2 Drawing Sheets

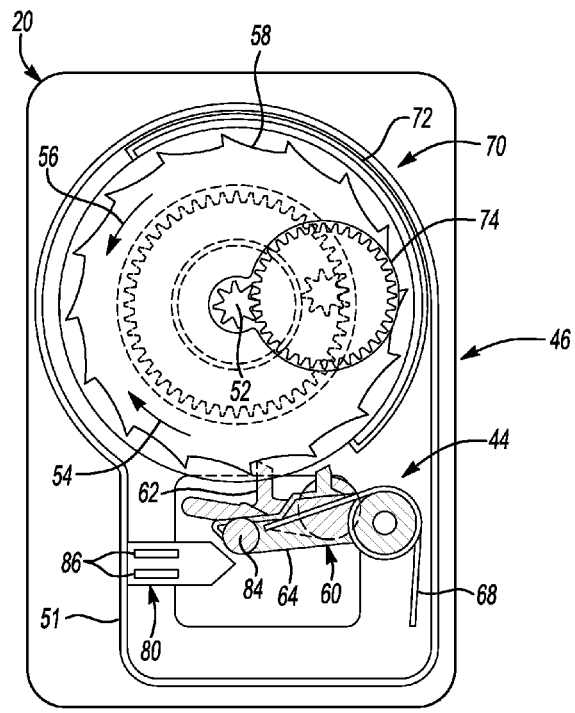
Fig-3
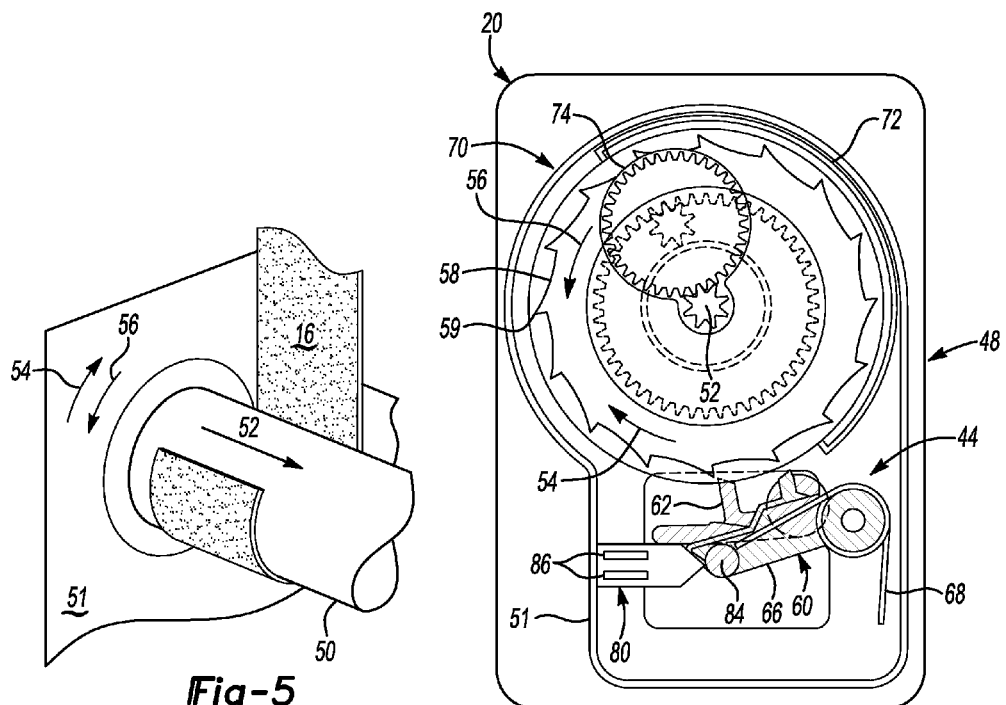
Fig-5
Fig-4

METHOD OF OPTIMIZING THRESHOLD FOR AN AIRBAG SUPPRESSION SYSTEM IN A VEHICLE

TECHNICAL FIELD

The present invention relates generally to a vehicle having seat belt webbing and an airbag suppression system, and more particularly, to a method for optimizing threshold for an airbag suppression system in a vehicle.

BACKGROUND

Recent guidelines require that children beneath a selected age and/or size not be subjected to impact by front airbags. In some vehicles, manual switches are provided to deactivate airbag deployment systems when a child restraint seat is occupied by a child. A driver or passenger can forget to operate the manual switch when a child is seated, or the airbag can be left in a deactivated mode when an adult is seated. This has led to arrangements for automatically deactivating airbags when the presence of a child rather than an adult in a vehicular seat is detected.

The threshold for enabling or suppressing air bag deployment is dependent on the design and calibration of the suppression system used. In systems where the occupant is classified based on a measure of the force applied to the seat, it can be difficult to reliably distinguish between a normally seated adult and a tightly belted car seat. If the seat belt is unduly tightened, it can create an additional downward force on the seat, creating an erroneous weight reading. In other words, a normally seated adult and a tightly belted car seat may apply a similar force on the seat.

SUMMARY

A method is presented of optimizing an airbag suppression threshold for an airbag suppression system in a vehicle. The method includes defining a first value as the airbag suppression threshold such that deployment of an airbag is suppressed above the first value. Next, one or more factors indicative of a presence of a child restraint seat in the vehicle seat are determined. The airbag suppression threshold is set to a predefined second value when each of the factors are met. The factors include determining whether a locking feature in the seat belt webbing retractor is in a first state configured to prevent withdrawal of the seat belt webbing. Another factor may be determining whether a speed of the vehicle is within a predetermined speed range. Another factor may be determining whether a load applied to the vehicle seat is within a predetermined seatload range.

Another factor may be determining whether an adult classification has been made with high confidence, for example, by determining whether the load applied to the vehicle seat is within a predetermined adult load range for at least a predetermined minimum time. Another factor may be determining whether the locking feature in the seat belt webbing retractor remains in the first state, configured to prevent withdrawal of the seat belt webbing, for at least a predefined minimum locking time. The method provides a way of distinguishing between an adult and a tightly-belted child restraint seat of similar apparent weight by determining the status of multiple factors that correlate with or indicate the presence of a child restraint seat.

A retractor for a seat belt webbing is provided. The retractor includes a spool on which the seat belt webbing may be wound. The spool is rotatable about a first axis in a belt-winding direction and in an opposite belt-withdrawal direction. A ratchet is rotatable about the first axis. The retractor includes a locking feature defined by a lever movable between first and second positions such that the lever in the first position blocks the rotation of the ratchet in the belt-withdrawal direction, thereby blocking rotation of the spool in the belt-withdrawal direction. The lever may block rotation of the spool either directly, or indirectly through a mechanism. A control mechanism may be used for controlling or driving the movement of the lever. A locking sensor is positioned within the retractor and configured to detect the position of the lever. In one embodiment, the locking sensor includes one or more hall effect sensors configured to sense the position of the lever by detecting the location of a magnetic element that is fixedly connected to the lever. In one embodiment, a pawl is operatively connected to the lever and configured to engage with the ratchet when the lever is in the first position. In one embodiment, the control mechanism includes a plurality of gears rotatable in response to rotation of the spool and a plurality of discs.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic end view of a retractor having a locking feature in a first state;

FIG. 4 is a schematic end view of the retractor of FIG. 3, with the locking feature in a second state; and FIG. 5 is a schematic fragmentary perspective view of a portion of the retractor of FIG. 3.

DETAILED DESCRIPTION

Figure 1:
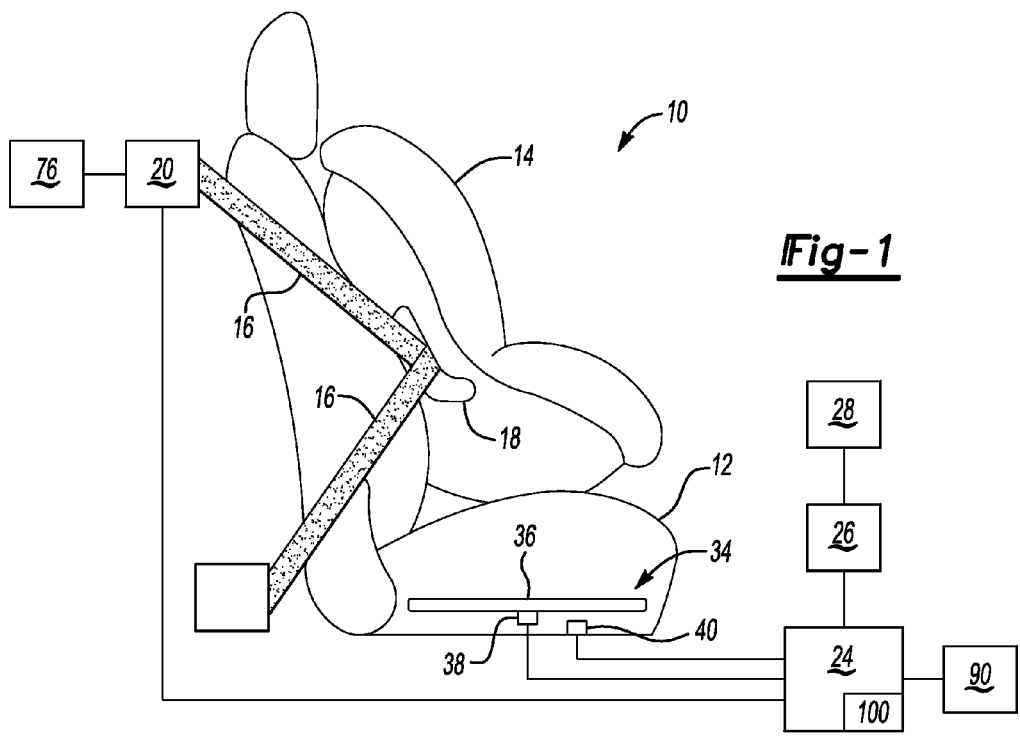
FIG. 1 is a schematic fragmentary side view of a vehicle having a vehicle seat occupied by a child restraint seat.

Referring to the Figures, wherein like reference numbers refer to the same or similar components throughout the several views, FIG. 1 shows a vehicle 10 having a vehicle seat 12 occupied by a child restraint seat 14. Referring to FIG. 1, the vehicle 10 includes seat belt webbing 16 that is operatively connected to a seat belt webbing retractor 20 (shown in FIGS. 3-4). The seat belt webbing 16 may be threaded through a slot 18 in the child restraint seat 14, in order to secure the child restraint seat 14 to the vehicle seat 12.

Referring to FIG. 1, a controller 24 is operatively connected to the retractor 20 and to an airbag control module 26. The airbag control module 26 suppresses deployment of an airbag 28 above an airbag suppression threshold and enables deployment of the airbag 28 below the airbag suppression threshold. Controller 24 is adapted to optimize the airbag suppression threshold for the vehicle 10. Controller 24 does so in part by executing an algorithm 100 which resides within the controller 24 or is otherwise readily executable by the controller 24. Execution of algorithm 100 is described in detail below with reference to FIG. 2.

Referring to FIG. 1, the algorithm 100 may be employed with a suppression system 34 that measures force, pressure and/or capacitance. Referring to FIG. 1, for a representative airbag suppression system, a fluid-filled pouch 36 may be placed under the vehicle seat 12. Any other type of airbag suppression system may be employed. The pouch 36 may contain a fluid such as silicone. A pressure sensor 38 may be coupled to the pouch 36, which provides an electrical output signal to the controller 24 (and thus to the airbag control module 26) indicative of the fluid pressure exerted on the pouch 36. The airbag control module 26 suppresses deployment of the airbag 28 when the pressure on the vehicle seat 12, as indicated by the pressure sensor 38, is below a threshold.

Referring to FIG. 1, in addition to the pressure sensor 38 or instead of it, a capacitive sensor 40 may be placed under the vehicle seat 12. The capacitive sensor 40 is configured to classify the occupant or distinguish between a seated passenger and a child restraint seat by measuring the change in electrical field between an electrode (not shown) and the vehicle seat 12. The algorithm 100 may also be employed with other types of suppression technology, including but not limited to, resistive sensors, seat frame strain sensors, or systems that measures the pattern of an object on the vehicle seat 12.

Figure 2:
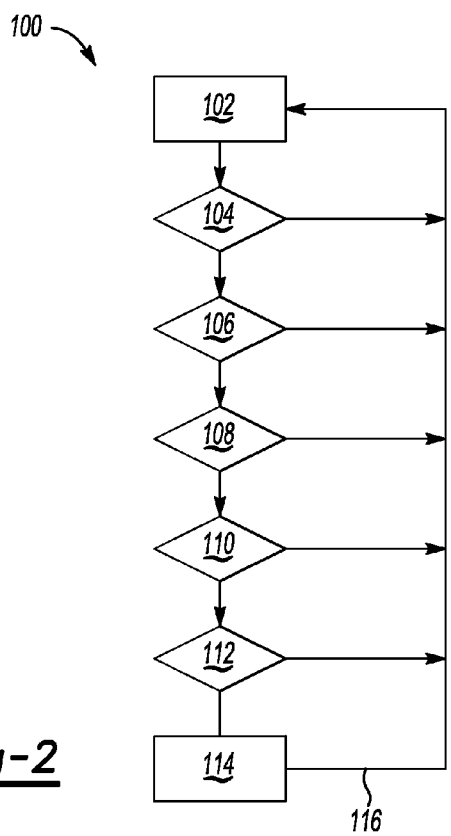
FIG. 2 is a schematic flow diagram for an algorithm or method of optimizing an airbag suppression threshold in accordance with the present disclosure.

Referring to FIG. 2, in step 102, the controller 24 selects a first value or "original classification threshold" as the airbag suppression threshold such that the airbag deployment is suppressed above the first value and enabled below the first value. Ordinarily, the airbag suppression threshold is set to the first value, but is changed to a second value or "compensated threshold" when multiple factors or considerations, as described below, are met. Each of the factors below correlate with or indicate a greater likelihood of the presence of a child restraint seat 14 in the vehicle seat 12.

Referring to FIG. 2, in step 104, the controller 24 determines whether an occupant classification of "adult" has been made with "high confidence." Referring to FIG. 1, in one embodiment, this corresponds to the force, weight or pressure on the vehicle seat 12, as detected by the pouch 36 and pressure sensor 38 or any other devices, being above a predetermined adult load for a minimum time $T_A$. In one example, an occupant classification of "adult" can be made with high confidence if a pressure in excess of 100 pounds is detected for at least 30 seconds. In another example, an occupant classification of "adult" can be made with high confidence if a pressure in excess of 40 pounds is detected for at least 2 minutes. If it is determined that an occupant classification of "adult" has been made with high confidence, the controller 24 proceeds to step 106; otherwise, the controller 24 returns to step 102.

Referring to FIG. 2, in step 106, the controller 24 determines whether a locking feature 44 in the retractor 20 (shown in FIG. 1) is in an activated or first state 46 configured to prevent or block withdrawal of the seat belt webbing 16. FIG. 3 is a schematic fragmentary end view of the retractor 20 showing the locking feature 44 in a first state 46. FIG. 4 is a schematic fragmentary end view of the retractor 20 showing the locking feature 44 in an inactive or second state 48 where withdrawal of the seat belt webbing 16 is not blocked. FIG. 5 is a schematic fragmentary perspective view of a portion of the retractor 20 showing a spool 50 on which the seat belt webbing 16 (also shown in FIG. 1) is wound. The spool 50 may be mounted to a portion of the retractor housing 51. The spool 50 is rotatable about a first axis 52 in a belt-winding direction 54 and in an opposite belt-withdrawal direction 56.

Referring to FIGS. 3-4, a ratchet 58 is also rotatable about the first axis 52. Referring to FIGS. 3-4, the locking feature 44 includes a lever 60 and a pawl 62. The lever 60 is movable between a first position 64 (shown in FIG. 3) and a second position 66 (shown in FIG. 4). The first position 64 of the lever 60 corresponds to the first state 46 of the locking feature 44 and the second position 66 of the lever 60 corresponds to the second state 48 of the locking feature 44. A spring 68 biases the lever 60 towards the second position 66. The lever 60 may be operatively connected to the pawl 62. The lever 60 and pawl 62 may also move independently in this embodiment. The lever 60 lifts pawl 62, but pawl 62 may also be lifted independently by a vehicle sensor (not shown) in the retractor 20.

Referring to FIG. 3, when the lever 60 is in the first position 64 (corresponding to the first state 46 of the locking feature 44), the lever 60 causes the pawl 62 to engage with the ratchet 58 to block rotation of the ratchet 58 in the belt-withdrawal direction 56, thereby blocking the rotation of the spool 50 in the belt-withdrawal direction 56. Referring to FIGS. 3-4, a control mechanism 70 may be used to drive the movement of the lever 60 and pawl 62. The control mechanism 70 may include multiple discs 72 and a gear train having a plurality of gears 74 that are rotatable in response to rotation of the spool 50. While the locking feature 44 is adapted to block withdrawal of seat belt webbing 16 from the retractor 20, the seat belt webbing 16 can still be wound onto the retractor 20, i.e., rotation of the spool 50 in the belt-winding direction 54 is not blocked. The locking feature 44 may be configured to block rotation of the spool 50 in the belt-withdrawal direction 56 when a predetermined amount of seat belt webbing 16 is withdrawn. The locking feature 44 may be configured to block rotation of the spool 50 in the belt-withdrawal direction 56 when the seat belt webbing 16 is fully withdrawn. FIGS. 3-4 illustrate one example of a locking feature 44, however, any type of mechanism that blocks the rotation of the spool 50 in a belt-withdrawal direction 56 may be used. Optionally, the locking feature may also be activated and inactivated manually through a pushbutton 76 in the vehicle 10.

Referring to FIGS. 3-4, a locking sensor 80 is mounted to a portion of the retractor 20 and operatively connected to the controller 24. The locking sensor 80 may be mounted to the retractor housing 51. The locking sensor 80 is configured to detect whether the locking feature 44 is in the first or second state 48 (shown in FIGS. 3-4, respectively) by sensing the position of the lever 60. The locking sensor 80 includes circuitry that allows the locking sensor 80 to act in a digital (on/off) mode, thereby acting as a switch for detecting whether the locking feature 44 is activated.

In one embodiment, the locking sensor 80 may include one or more hall effect sensors 86 configured to detect the position of a magnetic element 84 (shown in FIGS. 3-4) fixedly mounted to the lever 60. As the lever 60 moves between the first and second positions 64, 66, the magnetic element 84 mounted to the lever 60 also moves, thereby altering the local magnetic field. As is known to those of ordinary skill in the art, a hall effect sensor varies its output voltage in response to changes in magnetic field.

In another embodiment, the locking sensor 80 may be an optical proximity sensor that detects the position of the lever 60, without requiring a magnetic element 84 mounted to the lever 60. In another embodiment, the locking sensor 80 is a mechanical switch that switches between two states, i.e. turns on/off, as the lever 60 moves between the first and second positions 64, 66. If the locking sensor 80 determines that the lever 60 is in the first position 64 and therefore the locking feature 44 is in the first state 46 (shown in FIG. 3), the controller 24 moves to step 108. If the locking sensor 80 determines that the that the lever 60 is in the second position 66 and therefore the locking feature 44 is in the second state 48 (shown in FIG. 4), the controller 24 moves to step 102.

Referring to FIG. 2, in step 108, the controller 24 determines whether the speed of the vehicle 10 is within a predetermined speed range or below a maximum speed. Referring to FIG. 1, in order to access this information, the controller 24 may be operatively connected to an engine control unit 90. In one example, the predetermined speed range is 0-10 kilometers per hour. In one example, the maximum speed is 2 kilometers per hour. This limitation accounts for the fact that, ordinarily, an operator would not mount a child restraint seat 14 (shown in FIG. 1) while the vehicle 10 was moving. If it is determined that the speed of the vehicle 10 is within the predetermined speed range or below the maximum speed, the controller 24 moves to step 110; otherwise, it proceeds to step 102.

Referring to FIG. 2, in step 110, the controller 24 determines whether a load applied to the vehicle seat 12 is within a predetermined seat-load range. The seat-load range may be set to range from a maximum weight to a minimum weight ($W_{max}$ to $W_{min}$) plus a historical variance or standard deviation which is determined by statistical analysis. For example, the maximum weight $W_{max}$ may correspond to a heavy child restraint seat 12 that is tightly belted, i.e., having a high belt tension. For example, the minimum weight $W_{min}$ may correspond to a lightweight child restraint seat 12 that is loosely belted, i.e., having zero belt tension. In one example, the seat-load range is approximately 20 pounds to 38 pounds. If it is determined that the load applied to the vehicle seat 12 is within the predetermined seat-load range, the controller 24 moves to step 112; otherwise, it proceeds to step 102.

Referring to FIG. 2, in step 112, the controller 24 determines whether the locking feature 44 in the retractor 20 remains in the first state 46 (shown in FIG. 3) beyond a predetermined minimum locking time $T_L$. In one example, the minimum locking time $T_L$ is 10 seconds. This limitation accounts for scenarios where something other than a child restraint seat 12 causes a temporary activation of the locking feature 44, for example, an adult unintentionally setting the lock mechanism and then resetting it. The longer that the locking feature 44 in the retractor 20 remains in the first state 46, the greater the likelihood that the locking feature 44 was activated due to the presence of a child restraint seat 14. If it is determined that the locking feature 44 in the retractor 20 remains in the first state 46 beyond the minimum locking time $T_L$, the controller 24 moves to step 114; otherwise, it proceeds to step 102.

Referring to FIG. 2, in step 114, the controller 24 changes the airbag suppression threshold from the first value or "original classification threshold" to the second value or "compensated threshold." By way of example only, if the airbag suppression system is force or weight-based, the first value or "original classification threshold" may be 40 pounds such that deployment of the airbag is suppressed when the pressure or weight on the vehicle seat 12 is below 40 pounds. After determination of the factors correlating with the presence of a child restraint seat as described above, the second value or "compensated threshold" may be set to 70 pounds such that deployment of the airbag is suppressed when the force, pressure or weight on the vehicle seat 12 is below 70 pounds or equivalent. If it is determined that the locking feature 44 in the retractor 20 has been inactivated or moved to the second state 48, the controller 24 proceeds back to step 102, as shown by reference numeral 116.

It is within the scope of the present disclosure that the controller 24 employed may eliminate one or more factors or may determine the factors in an order other than as described above. The algorithm 100 provides a way of distinguishing between an adult and a tightly-belted child restraint seat of similar apparent weight by determining the status of multiple factors that correlate with or indicate the presence of a child restraint seat.

While the best modes for carrying out the invention have been described in detail, those familiar with the art to which this invention relates will recognize various alternative designs and embodiments for practicing the invention within the scope of the appended claims.

The invention claimed is:

1. A method of optimizing an airbag suppression threshold for an airbag suppression system in a vehicle having a vehicle seat, a seat belt webbing, a refractor and an airbag, the method comprising:
    defining a first value as the airbag suppression threshold such that deployment of the airbag is suppressed above the first value;
    determining one or more factors indicative of a presence of a child restraint seat in the vehicle seat;
    selectively setting the airbag suppression threshold to a predefined second value when each of the factors are met; and
    wherein the one or more factors include determining whether a locking feature in the retractor is in a first state configured to prevent withdrawal of the seat belt webbing, the locking feature being configured to enter the first state when a predefined amount of seat belt webbing is withdrawn.

2. The method of claim 1, wherein the factors include:
    determining whether a load applied to the vehicle seat remains above a predetermined adult load for at least a predetermined minimum time.

3. The method of claim 2, wherein the predetermined adult load is 100 pounds and the predetermined minimum time is 30 seconds.

4. The method of claim 1, wherein the factors include:
    determining whether a speed of the vehicle is within a predetermined speed range.

5. The method of claim 4, wherein the predetermined speed range is 0-10 kilometers per hour.

6. The method of claim 1, wherein the factors include:
    determining whether a load applied to the vehicle seat is within a predetermined seat-load range.

7. The method of claim 6, wherein the seat-load range is approximately between 20 and 38 pounds.

8. The method of claim 1, wherein the factors include:
    determining whether the locking feature in the retractor remains in the first state configured to prevent withdrawal of the seat belt webbing for at least a predefined minimum locking time.

9. The method of claim 8, wherein the predefined minimum locking time is 10 seconds.

10. The method of claim 1, wherein the airbag suppression system is pressure-based such that deployment of the airbag is suppressed when a pressure on the vehicle seat is above the first value.

11. A method of optimizing an airbag suppression threshold for an airbag suppression system in a vehicle having a vehicle seat, an airbag, a seat belt webbing and a retractor, the method comprising:
    defining a first value as the airbag suppression threshold such that the airbag is suppressed above the first value;
    determining one or more factors indicative of a presence of a child restraint seat in the vehicle seat;
    selectively setting the airbag suppression threshold to a predefined second value when each of the factors are met;
    wherein the factors include:
    determining whether a locking feature in the retractor is in a first state configured to prevent withdrawal of the seat belt webbing, the locking feature being configured to enter the first state when the seat belt webbing is fully extended;

determining whether an adult classification has been made with high confidence;

determining whether a speed of the vehicle is within a predetermined speed range;

determining whether a load applied to the vehicle seat is within a predetermined seatload range; and determining whether the locking feature in the retractor remains in the first state configured to prevent withdrawal of the seat belt webbing for at least a predefined minimum locking time.

12. The method of claim 11, wherein said determining whether an adult classification has been made with high confidence includes determining whether the load applied to the vehicle seat remains above a predetermined adult load for at least a predetermined minimum time.

13. The method of claim 1, wherein the locking feature is configured to enter the first state when the seat belt webbing is fully extended.

14. A method of optimizing an airbag suppression threshold for an airbag suppression system in a vehicle having a vehicle seat, a seat belt webbing, a retractor and an airbag, the method comprising:

defining a first value as the airbag suppression threshold such that deployment of the airbag is suppressed above the first value;

determining one or more factors indicative of a presence of a child restraint seat in the vehicle seat;

selectively setting the airbag suppression threshold to a predefined second value when each of the factors are met;

wherein the factors include determining whether a locking feature in the retractor remains in a first state configured to prevent withdrawal of the seat belt webbing for at least a predefined minimum locking time; and wherein the predefined minimum locking time is about 10 seconds.

15. The method of claim 14, wherein the factors include:
determining whether a load applied to the vehicle seat remains above a predetermined adult load for at least a predetermined minimum time.

16. The method of claim 15, wherein the predetermined adult load is 100 pounds and the predetermined minimum time is 30 seconds.

17. The method of claim 14, wherein the factors include:
determining whether a speed of the vehicle is within a predetermined speed range.

18. The method of claim 14, wherein the factors include:
determining whether a load applied to the vehicle seat is within a predetermined seat-load range.

19. The method of claim 18, wherein the seat-load range is approximately between 20 and 38 pounds.

* * * * *